United States Patent [19]

Kontz, Jr.

[11] Patent Number: 4,823,521
[45] Date of Patent: Apr. 25, 1989

[54] LANDSCAPING BED DIVIDER

[76] Inventor: Donald E. Kontz, Jr., P.O. Box 484, Lincoln City, Oreg. 97367

[21] Appl. No.: 101,734

[22] Filed: Sep. 28, 1987

[51] Int. Cl.⁴ .............................................. E02D 27/00
[52] U.S. Cl. ...................................... 52/102; 52/726; 52/730; 52/732
[58] Field of Search ................. 52/102, 103, 155, 586, 52/588, 732, 730; 404/7, 47, 68; 256/1, 32, 33; 47/33

[56] References Cited

U.S. PATENT DOCUMENTS

| D. 257,064 | 9/1980 | Kobee | D25/38 |
|---|---|---|---|
| 560,949 | 5/1896 | Thomas | 52/739 |
| 1,847,955 | 3/1932 | Galassi | 404/67 |
| 2,877,600 | 3/1959 | Slate | 47/33 |
| 3,788,001 | 1/1974 | Balfanz | 47/33 |
| 3,815,284 | 6/1974 | Schubach | 49/466 |
| 3,967,911 | 7/1976 | Miers | 52/396 |
| 4,281,473 | 8/1981 | Emalfarb et al. | 47/33 |
| 4,516,875 | 5/1985 | Turner | 52/365 |
| 4,644,685 | 2/1987 | Tisbo et al. | 47/33 |

Primary Examiner—James L. Ridgill, Jr.
Attorney, Agent, or Firm—Eugene D. Farley

[57] ABSTRACT

A landscaping bed divider for forming a boundary between adjacent landscaping areas comprises a continuous anchoring and dividing plate having opposite side faces along its upper margin, at least one tubular edge piece, and connecting means for connecting the tubular edge piece to one of said side faces, longitudinally thereof.

9 Claims, 1 Drawing Sheet

U.S. Patent  Apr. 25, 1989  4,823,521
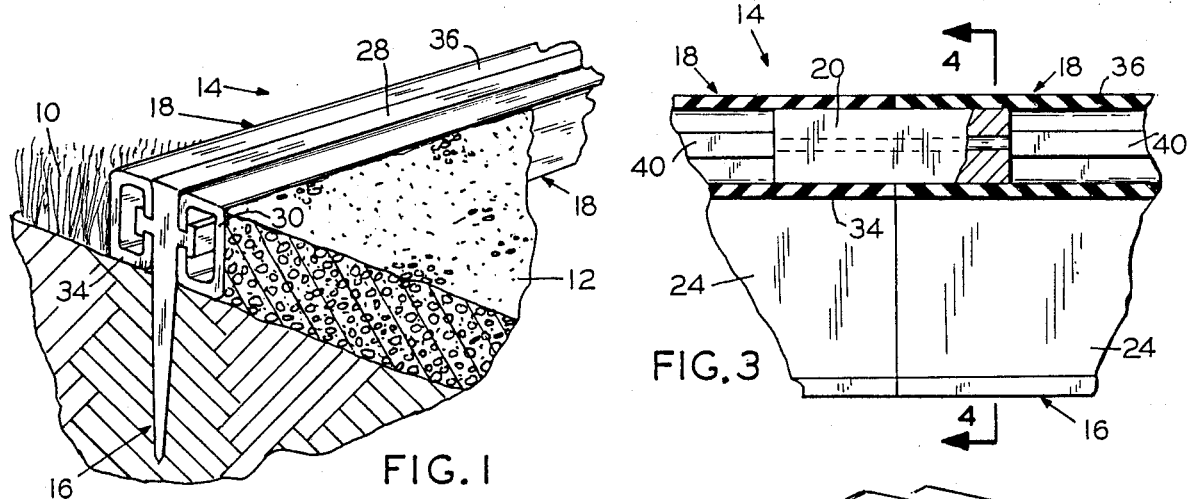
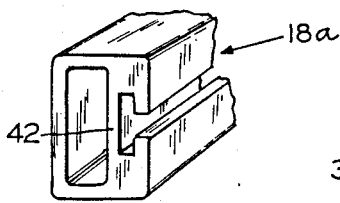
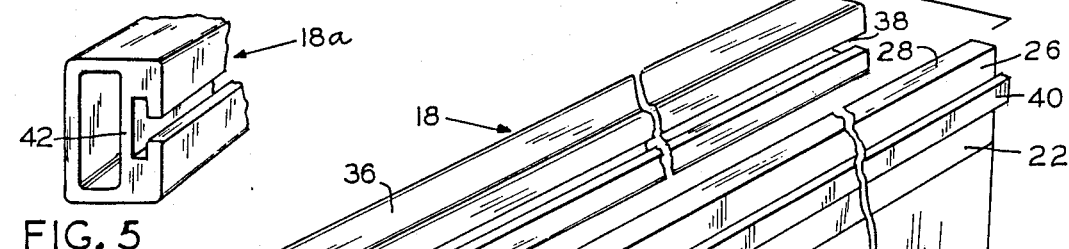
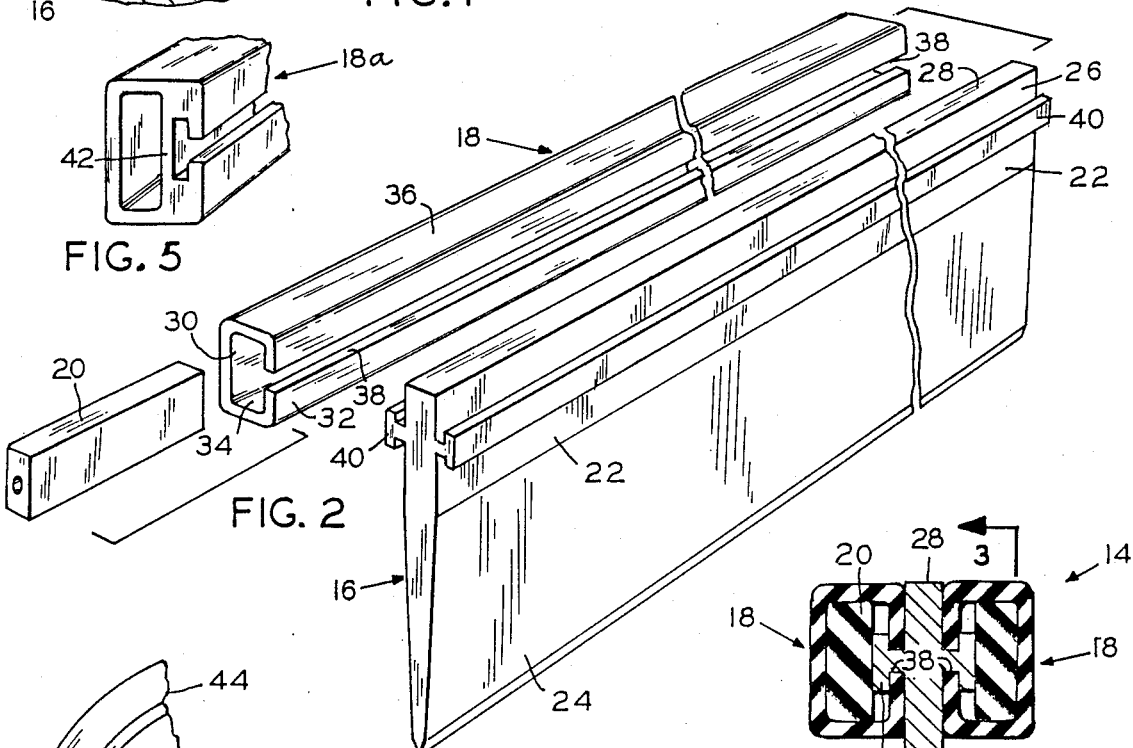
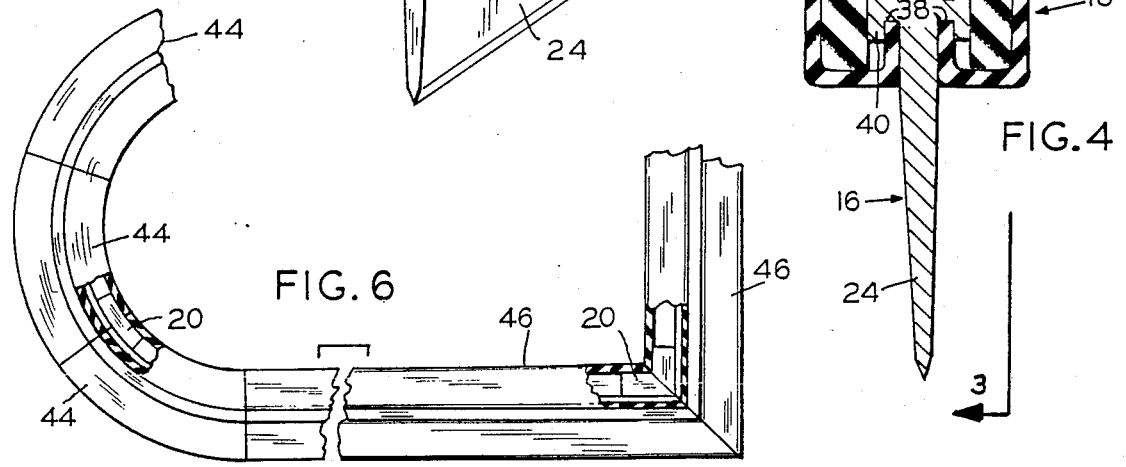

LANDSCAPING BED DIVIDER

BACKGROUND AND GENERAL STATEMENT OF THE INVENTION

This invention relates to landscaping bed dividers of the class employed for forming a boundary between adjacent landscaping areas.

It is the general object of the present invention to provide a landscaping bed divider having significant advantages, in that it:

Provides a neat landscaping edge between landscaped areas.

Provides an effective root stop between landscaped areas.

Is versatile in that it may be employed in the separation of landscaped areas incorporating grassy margins, wood chip margins, gravel margins and cement margins.

Is further versatile in that it may be used with equal facility to divide landscaped areas of varying contour, whether straight, angled, arcuate or irregular.

Is easily installed and, when installed, is securely anchored in place against shock induced by striking, lawnmower passage, or ground upheaval.

May be manufactured in modular units which may be joined end to end to form a continuous strip of any desired length.

As ancillary functions, it may be employed as a concrete form or as a guideway for carrying lawn or garden electric lighting wires, or irrigation conduits.

The foregoing and other objects of the present invention are attained by the provision of a landscaping bed divider comprising a continuous anchoring and dividing plate having opposite side faces on its upper margin, at least one tubular edge piece, and connecting means for connecting the tubular edge piece to one of the side faces, longitudinally thereof. The dividing plate is downwardly tapered to provide a ground-entering wedge with the result that the divider may be installed by hammer or foot pressure, with the tubular edge pieces seated firmly against the upper surface of the ground, thereby stabilizing the assembly in its operative position.

THE DRAWINGS

In the drawings:

FIG. 1 is a fragmentary view in top perspective of the landscaping bed divider of my invention.

FIG. 2 is an exploded, foreshortened view of the elements comprising the same.

FIG. 3 is a fragmentary, longitudinal, sectional view taken along line 3—3 of FIG. 4, and illustrating the manner of joining modular units of my landscaping bed divider end-to-end.

FIG. 4 is a transverse sectional view taken along line 4—4 of FIG. 3.

FIG. 5 is a fragmentary view in top perspective of an alternate tubular edging piece for use in the herein described landscaping bed divider.

FIG. 6 is a fragmentary schematic view illustrating the manner in which my landscaping bed divider adapts itself to the edging of beds of varying contour.

DESCRIPTION OF PREFERRED EMBODIMENTS OF THE INVENTION

FIG. 1 illustrates a typical landscaping situation in which the landscaping bed divider of my invention may be employed. As illustrated, a lawn area 10 is separated from a gravel walk 12 by means of the divider, indicated generally at 14. In the alternative, the lawn area may be separated from garden beds covered with sawdust or wood chips, or from a concrete walk, as will be described hereinafter.

As illustrated in FIG. 2, the presently described divider comprises an assembly of four pieces: A continuous anchoring and dividing plate indicated generally at 16, a pair of tubular edging pieces, indicated generally at 18, and connecting blocks or plugs 20 for connecting the divider modules end-to-end to any desired length.

All of these members of the assembly may be fabricated by extrusion from an extrudable material such as plastic, rubber, reclaimed rubber, or synthetic rubber. Because of its advantageous properties for the present purpose, and its availability, polyvinyl chloride is a preferred material.

In its illustrated form, the continuous anchoring and dividing plate 16 comprises an elongated, plate-shaped high impact member having an upper section 22 and a lower section 24. Upper plate section 22 is rectangular in cross section and provided with a pair of opposite, flat side faces 26 and a flat top face 28.

Lower dividing plate section 24 is downwardly tapered in a wedge-shaped configuration. Its lower extremity is pointed, to form a wedge-shaped member adapted to be driven into the ground.

Each piece 18 comprises a tubular member, rectangular in cross section. It has a first side wall 30, a second side wall 32, a bottom wall 34, and a top wall 36.

Top wall 36 preferably is flat and, in the installed condition of the side piece, coplanar with the top 28 of divider plate 16.

Side wall 32 is provided with a longitudinal slot 38 which serves as a splineway for use in connecting the side piece to the divider plate.

The preferred and illustrated connecting means for connecting the two pieces together comprises splineway 38 cooperating with a T-configured (in cross section) spline 40 which extends longitudinally along upper plate section 22, one such spline being present on each side face 26.

Connecting means also are provided for interconnecting side pieces 18 end-to-end, as required to form a finished divider of the desired length.

The illustrated interconnecting piece comprises the plug type connector 20 dimensioned for insertion into one or both of the opened-ended tubular edge pieces 18. When thus inserted in abutting edge pieces it forms a joint illustrated in detail in FIGS. 3 and 4.

A modified form of edge piece 18a is illustrated in FIG. 5. It is characterized by the inclusion of a septum wall 42 which, in use, lends stability to the assembly.

As noted above, it is one of the features of the assembly that it is adaptable to landscape dividing and edging situations where lawn and garden areas of varying contour are involved. The manner in which this is made possible is illustrated in FIG. 6.

First of all, minor deviations in contour may be accommodated by the assembly of FIGS. 1–5, inclusive, since the elements are flexible and may be bent to fit moderate changes in contour.

However, if there are major changes in contour the components of the assembly may be molded, welded or cast in arcuate modules 44, or angular modules 46. The arcuate modules may, of course, be shaped in any desired radius and cut to any desired length.

OPERATION

The landscaping bed divider of my invention is installed between a grassy area 10, and a gravel area 12 by assembling the component units 16, 18 and 20 and driving wedge-shaped lower plate section 24 into the ground along the desired contour line. This may be accomplished by applying foot pressure, or by striking flat upper surface 28 of the divider plate with a blunt instrument such as a mallet or hammer. The surface thus serves as an anvil.

The divider plate is pressed or driven into the ground until the undersurfaces 34 of edge pieces 18, or 18a bear against the upper surface of the lawn, gravel or sawdust, as the case may be. This forms a stabilized installed unit which resists dislodging impact. It also provides a flat upper surface which cleanly defines the separated areas.

If one of the areas concerned is to be a concrete walk, or other concrete installation, the side piece on the concrete side may be omitted. In this case the divider plate serves as a substitute benderboard concrete form.

If a sprinkling system or garden lighting is to be associated with the areas concerned, the water lines or, in the alternative, the electric lines may be run to advantage through the hollow interiors of tubular edge pieces 18 and hollow connecting plugs 20.

Having thus described in detail preferred embodiments of the present invention, it will be apparent to those skilled in the art that various physical changes may be made in the device described herein without altering the inventive concepts and principles embodied. The present embodiment is therefore to be considered in all respects as illustrative and not restrictive, the scope of the invention being indicated by the appended claims. All changes which come within the meaning and range of equivalency of the claims are therefore to be embraced therein.

I claim:

1. A landscaping bed divider comprising:
   (a) an elongated continuous integral anchoring and dividing plate having opposite side faces and a top face,
   (b) at least one elongated tubular edge piece, and
   (c) connecting means on the tubular edge piece and one side face of the anchoring and dividing plate for connecting the tubular edge piece to said one side face for extension alongside said anchoring and dividing plate adjacent the top face thereof.

2. The landscaping bed divider of claim 1 wherein there are two tubular edge pieces, one on each of the opposite side faces of the anchoring and dividing plate adjacent the top face thereof.

3. The landscaping bed divider of claim 1 wherein there are a plurality of anchoring and dividing plates and tubular edge pieces adapted to be placed end to end, wherein the tubular edge pieces have open ends, and including joiner plugs dimensioned for insertion in the open ends of the tubular edge pieces for joining them together.

4. The landscaping bed divider of claim 1
   wherein the upper portion of the anchoring and dividing plate is rectangular in cross section with a flat top face and its lower portion downwardly tapered to form a ground-entering wedge,
   wherein there are two tubular edge pieces rectangular in cross section and having flat tops substantially coplanar with the flat top face of the anchoring and dividing plate, and
   wherein the connecting means comprises spline means integral with and extending along the said side faces of the anchoring and dividing plate, and cooperating splineway means integral with and extending along the immediately adjacent portions of the tubular edge pieces.

5. The landscaping bed divider of claim 1 wherein the upper portion of the anchoring and dividing plate is rectangular in cross section and its lower portion downwardly tapered to form a ground-entering wedge.

6. The landscaping bed divider of claim 5 wherein the tubular edge piece is rectangular in cross section and the anchoring and dividing plate has a flat top face substantially coplanar with the top of the tubular edge piece.

7. The landscaping bed divider of claim 1 wherein the connecting means comprises spline and splineway means one extending along and integral with said one side face and the other extending along and integral with said tubular edge piece for releasably securing the tubular edge piece to the anchoring and dividing plate.

8. The landscaping bed divider of claim 7 wherein the splineway is located on the tubular edge piece and the spline on the anchoring and dividing plate, the spline comprising a spline member T-shaped in cross section.

9. The landscaping bed divider of claim 7 wherein the splineway is defined in part by a septum positioned across the tubular edge piece and separating the interior of the tubular edge piece from the splineway.

* * * * *